(12) United States Patent
Kim (10) Patent No.: US 10,069,889 B2
(45) Date of Patent: Sep. 4, 2018

(54) NETWORK CAMERA AND NETWORK IMAGE SURVEILLANCE SYSTEM

(71) Applicant: HANWHA TECHWIN CO., LTD., Changwon-si (KR)

(72) Inventor: Hak Je Kim, Changwon-si (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 586 days.

(21) Appl. No.: 14/509,231

(22) Filed: Oct. 8, 2014

(65) Prior Publication Data

US 2015/0195324 A1    Jul. 9, 2015

(30) Foreign Application Priority Data

Jan. 3, 2014  (KR) .................. 10-2014-0000829

(51) Int. Cl.
*H04L 29/06* (2006.01)
*H04L 12/721* (2013.01)
*H04L 12/753* (2013.01)
*H04L 12/707* (2013.01)
*H04N 7/18* (2006.01)

(52) U.S. Cl.
CPC .......... *H04L 65/607* (2013.01); *H04L 65/80* (2013.01); *H04L 29/06* (2013.01); *H04L 45/12* (2013.01); *H04L 45/22* (2013.01); *H04L 45/24* (2013.01); *H04L 45/48* (2013.01); *H04N 7/181* (2013.01)

(58) Field of Classification Search
CPC ......... H04L 29/06; H04L 45/22; H04L 45/24; H04L 65/607; H04L 65/80; H04N 7/18
See application file for complete search history.

(56) References Cited

U.S. PATENT DOCUMENTS 5,867,484 A * 2/1999 Shaunfield ............ H04J 3/1611
                                                    348/E7.053
6,775,271 B1 * 8/2004 Johnson ................ H04M 3/007
                                                    370/352

(Continued)

FOREIGN PATENT DOCUMENTS

KR  10-2006-0025227 A   3/2006
KR  10-2011-0114957 A  10/2011

(Continued)

*Primary Examiner* — Patrice L Winder
*Assistant Examiner* — Angela M Widhalm de Rodriguez
(74) *Attorney, Agent, or Firm* — Sughrue Mion, PLLC (57) ABSTRACT

A network camera and a network image surveillance system including the network camera are provided. The network camera may include: an image and audio encoding unit configured to convert an optical image incident from a lens, compress an audio signal from a microphone in a predetermined format, and generate compressed streaming data by encoding the converted image and the compressed audio signal; a network controlling unit configured to monitor an input and output status of the compressed streaming data, control a configuration of a packet of the compressed streaming data in accordance with a network quality of system (QoS), control synchronizing the compressed streaming data with a video frame, and transmit the synchronized streaming data; and a network routing unit configured to route input and output of the data via at least one network port and implement redundancy by using a Spanning Tree Protocol (STP).

17 Claims, 7 Drawing Sheets

(56) References Cited

U.S. PATENT DOCUMENTS

| | | | | |
|---|---|---|---|---|
| 7,023,913 B1* | 4/2006 | Monroe | G08B 13/19628 | 348/143 |
| 7,363,525 B2* | 4/2008 | Biederman | H04L 12/10 | 709/230 |
| 7,730,200 B2* | 6/2010 | Beers | H04L 12/1827 | 709/229 |
| 7,852,873 B2* | 12/2010 | Bird | H04L 41/24 | 370/463 |
| 7,978,727 B2* | 7/2011 | Nemoto | H04J 3/1617 | 370/466 |
| 8,060,908 B2* | 11/2011 | Bountour | H04N 7/181 | 725/141 |
| 8,320,387 B2* | 11/2012 | Jiang | H04L 12/437 | 370/222 |
| 8,737,270 B2* | 5/2014 | Farkas | H04L 41/0803 | 370/216 |
| 9,144,097 B2* | 9/2015 | Kao | H04N 7/181 | |
| 9,641,799 B2* | 5/2017 | Smurro | H04N 7/15 | |
| 9,703,796 B2* | 7/2017 | Kumar | G06F 17/30156 | |
| 2004/0081234 A1* | 4/2004 | Kajita | G06F 11/263 | 375/224 |
| 2008/0285459 A1* | 11/2008 | Diab | H04L 12/2805 | 370/238 |
| 2014/0071885 A1* | 3/2014 | Cherian | H04W 40/22 | 370/315 |
| 2014/0115182 A1* | 4/2014 | Sabaa | H04L 67/1097 | 709/232 |
| 2014/0126421 A1* | 5/2014 | Lida | H04L 41/12 | 370/254 |
| 2015/0085132 A1* | 3/2015 | Bekiares | H04N 7/181 | 348/159 |
| 2015/0127853 A1* | 5/2015 | Roskind | H04L 61/2503 | 709/245 |
| 2016/0173511 A1* | 6/2016 | Bratspiess | H04L 41/145 | 726/23 |

FOREIGN PATENT DOCUMENTS

| | | |
|---|---|---|
| KR | 10-1205427 B1 | 11/2012 |
| KR | 10-2013-0038147 A | 4/2013 |

\* cited by examiner

| Bandwidth | STP Cost |
|---|---|
| 4Mbps | 250 |
| 10Mbps | 100 |
| 16Mbps | 62 |
| 450Mbps | 39 |
| 100Mbps | 19 |
| 155Mbps | 14 |
| 622Mbps | 6 |
| 1Gbps | 4 |
| 10Gbps | 2 |

NETWORK CAMERA AND NETWORK IMAGE SURVEILLANCE SYSTEM

CROSS-REFERENCE TO RELATED APPLICATION

This application claims priority from Korean Patent Application No. 10-2014-0000829, filed on Jan. 3, 2014, in the Korean Intellectual Property Office, the disclosure of which is incorporated herein in its entirety by reference.

BACKGROUND

1. Field

Apparatuses and methods consistent with exemplary embodiments relate to a network camera and a network image surveillance system including the network cameras.

2. Description of the Related Art

A network image surveillance system includes imaging devices such as network cameras installed in an environment of a street, a building, a factory, or the like that a user desires to monitor for a specific purpose or for security, and monitors the environment.

Since a conventional network image surveillance system has a star-shaped topology or a tree-shaped topology, a network configuration thereof is limited and wiring thereof is complicated. In addition, in Carrier Sense Multiple-Access/Collision Detection (CSMA/CD) asynchronous communication used in the conventional network image surveillance system, images are frequently disconnected.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments include a network camera including a router that is mounted therein and is converged therewith.

In the network camera, physical layers of network ports used for a network communication are implemented as optical cables, and a ring topology structure is used.

When the network camera is equipped with a routing function and transmits data using the routing function within the network image surveillance system, the network camera transmits the data in units of frames of an image in order to prevent image display from being interrupted.

Additional aspects will be set forth in part in the description which follows and, in part, will be apparent from the description, or may be learned by practice of the exemplary embodiments.

According to an aspect of an exemplary embodiment, there is provided a network camera including: an image and audio encoding unit configured to convert an optical image incident from a lens, compress an audio signal from a microphone in a predetermined format, and generate compressed streaming data by encoding the converted image and the compressed audio signal; a network controlling unit configured to monitor an input and output status of the compressed streaming data, control a configuration of a packet of the compressed streaming data in accordance with a network quality of system (QoS), and control synchronizing the compressed streaming data with a video frame, and transmit the synchronized streaming data; and a network routing unit configured to route input and output of data via at least one network port and implement redundancy by using a Spanning Tree Protocol (STP).

The network routing unit may include an internal port configured to communicate with the network controlling unit and two external ports configured to communicate with network communication units including two physical layers, and transmit the compressed streaming data received from the network controlling unit via the internal port to the network communication units via a first external port from among the two external ports.

The two external ports are further configured to transmit, if an error occurs in the first external port, the compressed streaming data via a second external port from among the two external ports in a routing direction opposite to a direction in which the data is transmitted via the first external port.

A plurality of network cameras may select a network camera performing a root router function from among the plurality of network cameras by exchanging a Configuration Bridge Protocol Data Unit (BPDU) frame in synchronization with a video frame, and network cameras connected to the network camera performing the root router function from among the plurality of network cameras set a routing port and a routing direction based on a root path cost.

According to an aspect of another exemplary embodiment, there is provided a network image surveillance system including: a server, a monitoring terminal, a switch, and at least one network camera, wherein the at least one network camera may include an image and audio encoding unit configured to generate compressed streaming data by converting an optical image incident from a lens, compressing an audio signal received from a microphone in a predetermined format, and encoding the converted optical image and compressed audio signal; a network controlling unit configured to monitor and receive an input and output status of the compressed streaming data, control a configuration of a packet of the received compressed streaming data in accordance with a network quality of system (QoS), and transmit the compressed streaming data in synchronization with a video frame of the image; and a network routing unit configured to route an input and output of the data via at least one network port and implement redundancy by using a Spanning Tree Protocol (STP), and wherein the server, the monitoring terminal, the switch, and the plurality of network cameras form a ring topology structure.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Also, well-known functions or constructions are not described in detail since they would obscure the exemplary embodiments with unnecessary detail.

Figure 1:
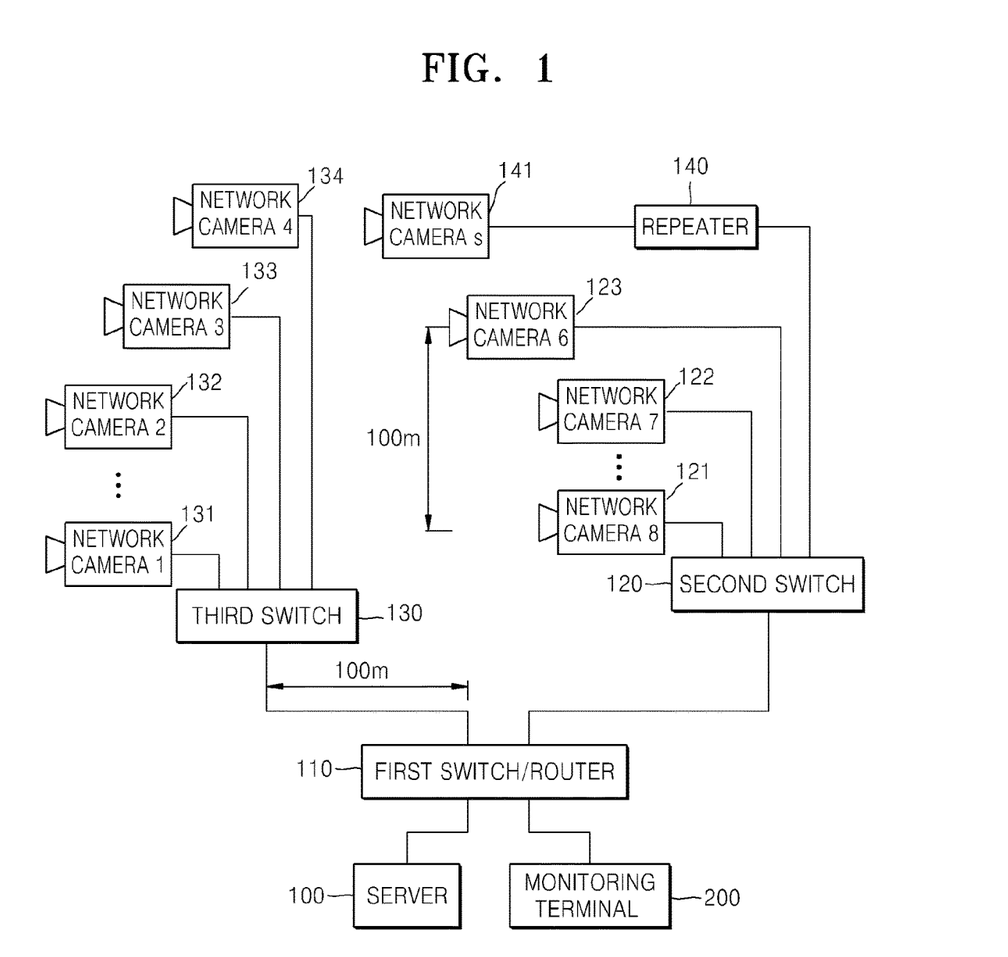
FIG. 1 is a block diagram of a conventional network image surveillance system.

FIG. 1 is a block diagram of a conventional network image surveillance system. As illustrated in FIG. 1, the conventional network image surveillance system may include a server 100, a monitoring terminal 200, a first switch/router 110, second and third switches 120 and 130, a repeater 140, and a plurality of network cameras 121, 122, 123, 131, 132, 133, 134, and 141.

In the conventional network image surveillance system, when an interval between the first switch 110 and the second switch 120 and an interval between the first switch 110 and the third switch 130 exceed a certain distance, for example, 100 meters, signals from the first, second, and third switches 110, 120 and 130 to the network cameras 121, 122, 123, 131, 132, 133, 134, and 141 are damaged during transmission, and therefore the damaged signals need to be compensated for by the repeater 140 or other switches.

For example, when the second switch 120 desires to receive a signal from the network camera 141 located 100 meters away therefrom, the second switch 120 may receive the signal via the repeater 140.

Due to these constraints, to install the plurality of network cameras 121, 122, 123, 131, 134 and 141, the conventional network image surveillance system has a tree-shaped network via a hub or the first, second, and third switch/routers 110, 120 and 130, and the repeater 140.

Since the conventional network image surveillance system has a star- or a tree-shaped topology, its network configuration is limited, and its wiring is complicated.

Figure 2:
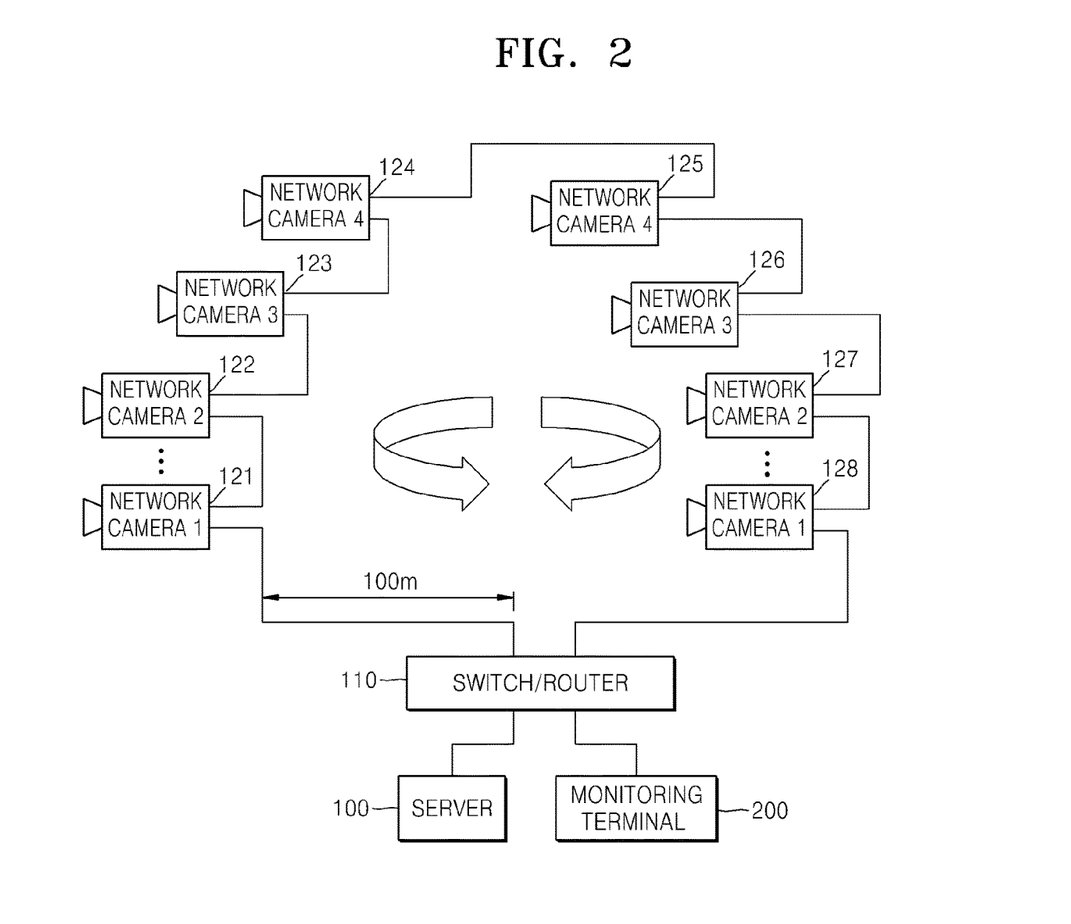
FIG. 2 is a block diagram of a network image surveillance system having a ring topology structure according to an exemplary embodiment.

FIG. 2 is a block diagram of a network image surveillance system having a ring topology structure according to an exemplary embodiment. Referring to FIG. 2, the network image surveillance system may include a server 100, a monitoring terminal 200, a switch and/or router 110, and a plurality of network cameras 121, 122, 123, 124, 125, 126, 127, and 128.

The plurality of network cameras 121, 122, 123, 124, 125, 126, 127, and 128, and the monitoring terminal 200 perform data communication via any of various communication networks, such as an internet or an intranet.

According to an exemplary embodiment, a network camera may be a data transmission apparatus that transmits data via a network and may be applied to not only a digital image processor but also to image processing apparatuses such as smartphones, hand-held apparatuses, notebooks, personal digital assistants (PDAs), and personal multimedia players (PMPs). This is equally applied to exemplary embodiments and modifications thereof which will be described later.

The monitoring terminal 200 receives data from the plurality of network cameras 121, 122, 123, 124, 125, 126, 127, and 128. The monitoring terminal 200 may include a personal computer (PC), a network video recorder (NVR), a digital video recorder (DVR), a notebook, and various other devices.

As illustrated in FIG. 2, in the network image surveillance system having the ring topology structure, when a power is initially turned on, each of the plurality of network cameras 121, 122, 123, 124, 125, 126, 127, and 128 selects a root router camera. The root router camera refers to a camera located at a final data transmission stage.

Figure 3:
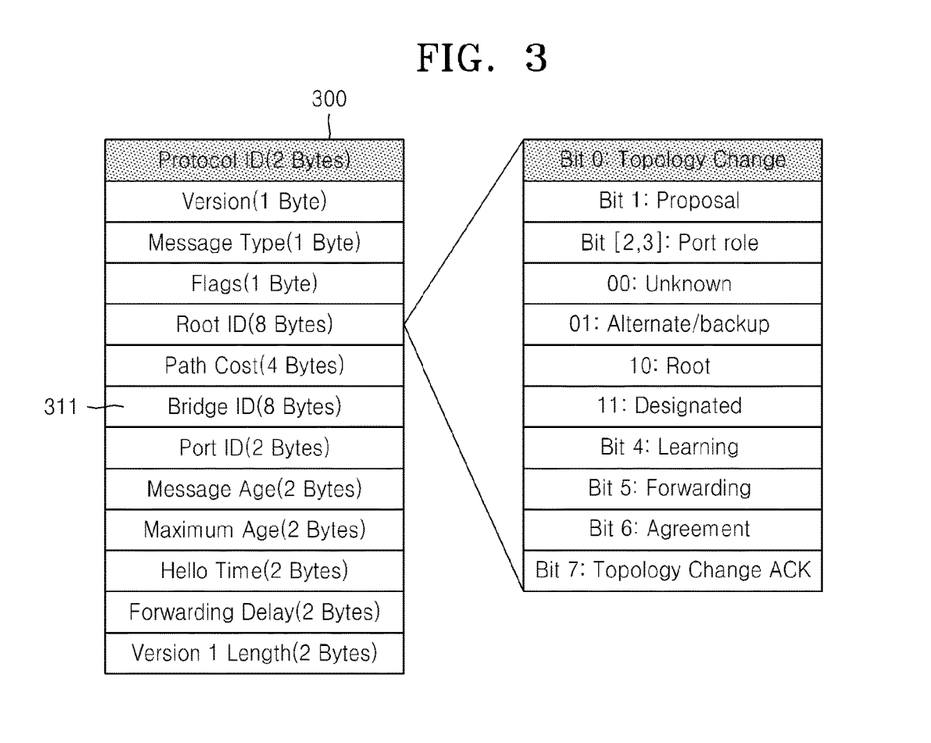
FIG. 3 illustrates an internal configuration of a Bridge Protocol Data Unit (BPDU) frame.

According to an exemplary embodiment, each of the plurality of network cameras 121, 122, 123, 124, 125, 126, 126, 127, and 128 transmits data in synchronization with a video frame in order to select a root router camera, and exchanges a configuration Bridge Protocol Data Unit (BPDU) frame illustrated in FIG. 3 with each other in order to ascertain a network situation.

Figure 4:
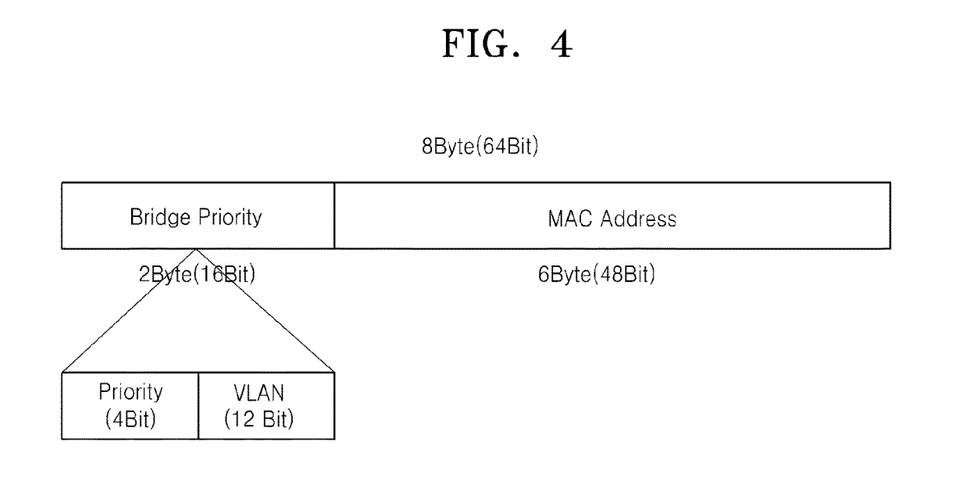
FIG. 4 illustrates an internal configuration of a Bridge identifier (ID)
Figure 5:
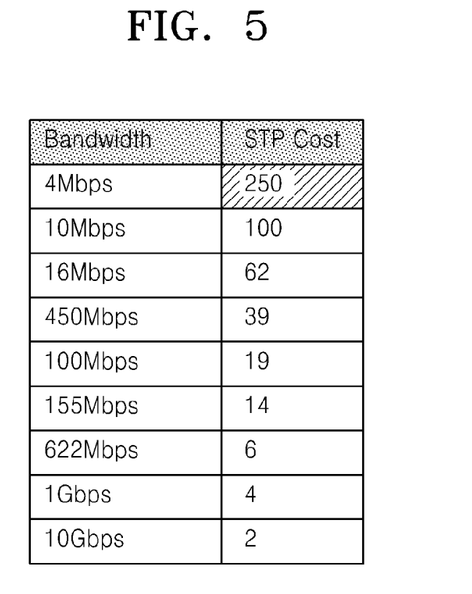
FIG. 5 illustrates an example of a cost table.

In particular, the root router camera is identified via a process of exchanging a root path cost by using a Bridge identifier (ID) 311 within the configuration BPDU frame and a cost table as an exemplary embodiment illustrated in FIG. 5.

The identified root router camera generates and sends out BDPU frames in units of video frames.

When the identified root router camera sends out the BPDU frames, other network cameras connecting to the root router camera set a routing port and a routing direction, based on the root path cost.

Figure 7:
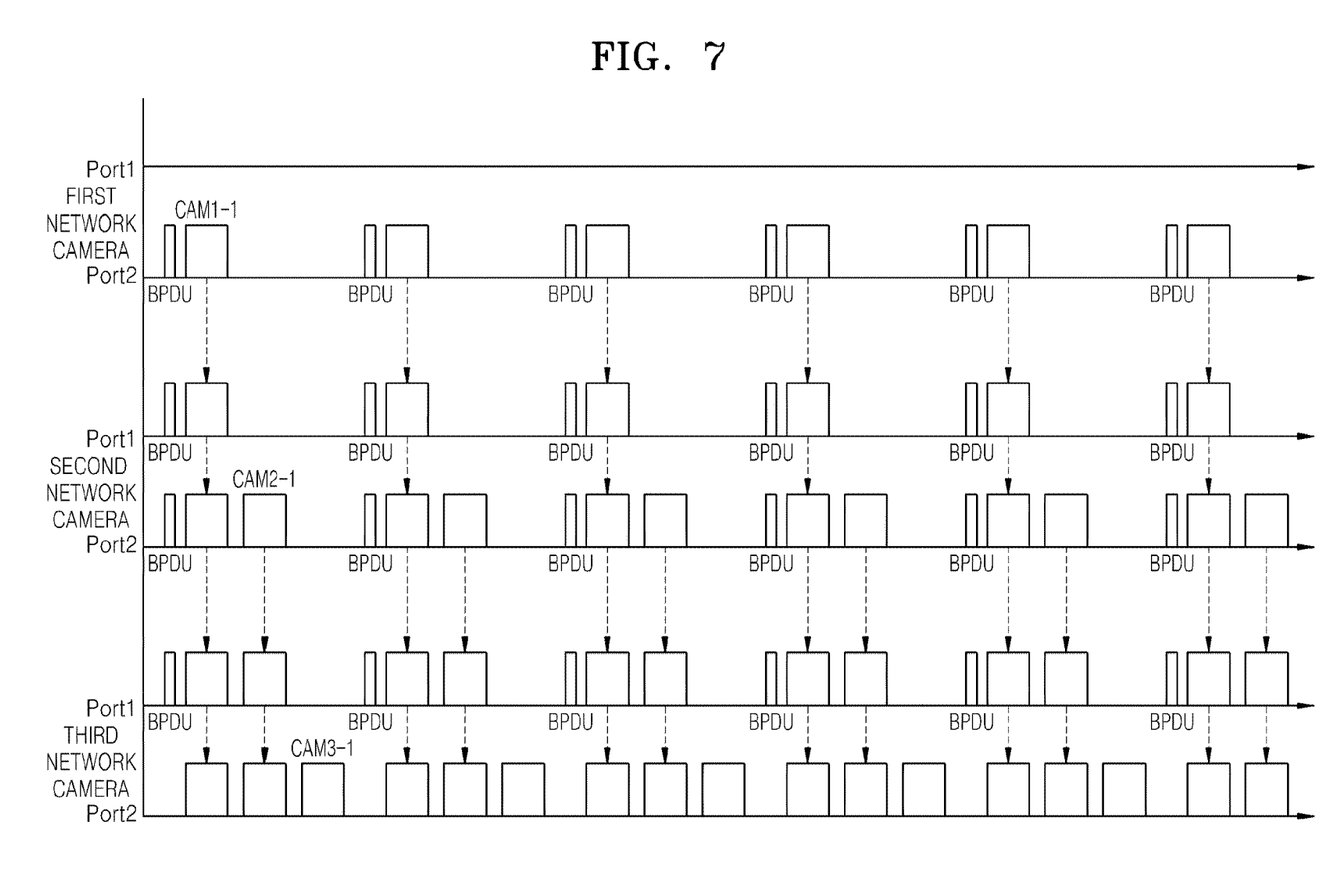
FIG. 7 illustrates an example in which a network image surveillance system transmits data in a sequential transmission mode according to an exemplary embodiment.

When a routing setting is completed via the above-described process, data may be transmitted in a sequential transmission mode as in an exemplary embodiment illustrated in FIG. 7.

Figure 6:
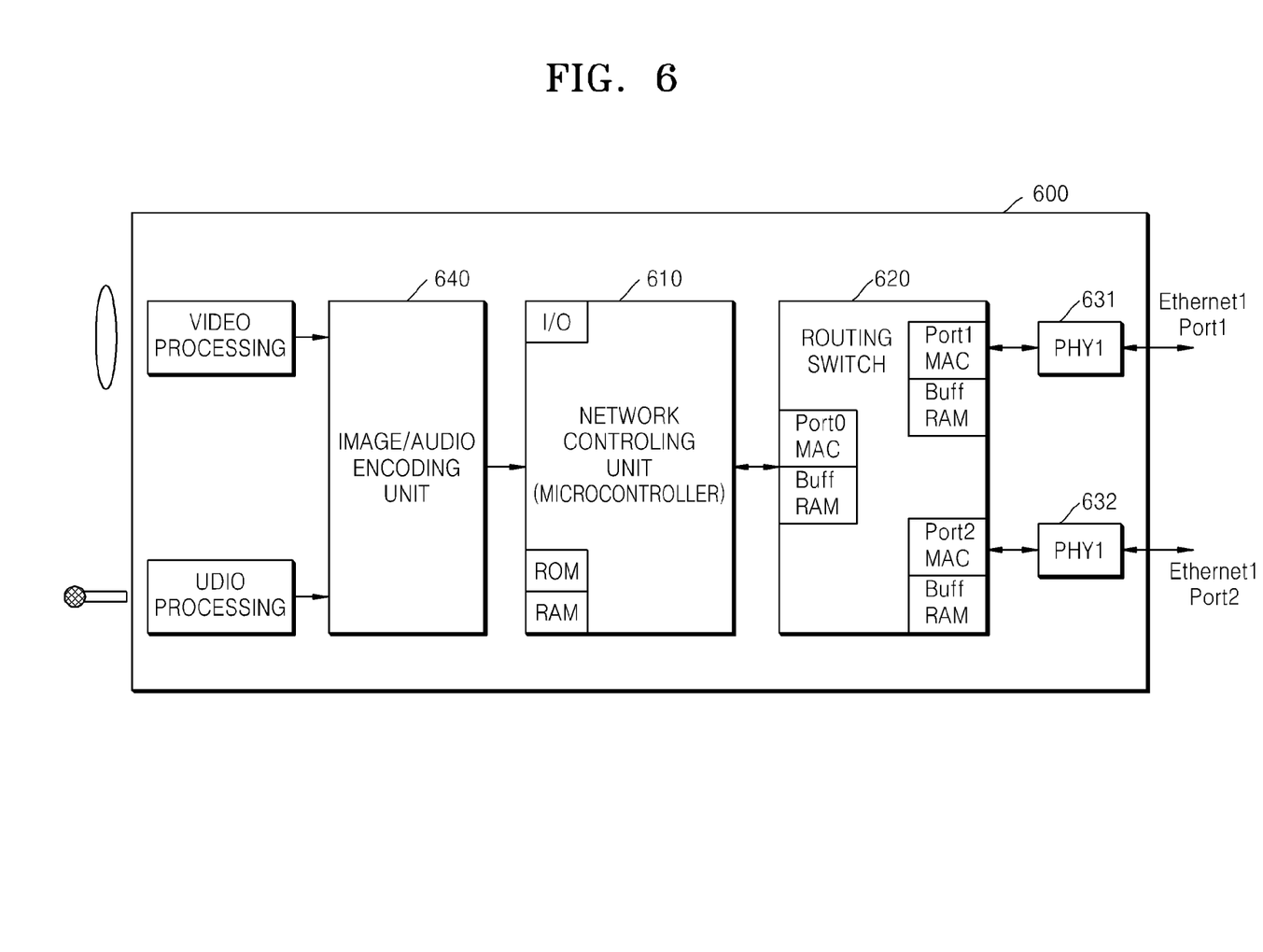
FIG. 6 is a block diagram of a network camera equipped with a network routing function according to an exemplary embodiment.

FIG. 6 is a block diagram of a network camera 600 according to an exemplary embodiment. Referring to FIG. 6, the network camera 600 may include a network controlling unit 610, a network routing unit 620, network communication units 631 and 632, and an image and audio encoding unit 640.

The image and audio encoding unit 640 performs encoding by converting an optical image incident from a lens, performing an audio processing on an audio received from a microphone, and compressing the image and audio in various formats.

Streaming data obtained by the compression in the image and audio encoding unit 640 is transmitted to a monitoring terminal (e.g., the monitoring terminal 200 of FIG. 2) via any of various networks such as the internet, the intranet, or a local area network (LAN).

The network controlling unit 610 receives the streaming data from the image and audio encoding unit 640 and controls a data packet configuration or the network routing unit 620 to efficiently transmit the streaming data according to quality of service (QoS) states of the network.

The network controlling unit 610 may be implemented so as to control a priority of the streaming data according to whether the streaming data is an I frame, a B frame or a P frame.

The network controlling unit 610 may be also implemented so as to synchronize and transmit the streaming data by a video frame period.

The network controlling unit 610 may include a memory that stores the compressed streaming data received from the image and audio encoding unit 640. The memory may include a read only memory (ROM) and a random access memory (RAM). The network controlling unit 610 may further include an input/output (I/O) unit for inputting and outputting data.

The network controlling unit 610 may further include a direct memory access (DMA), a timer, or the like in order to effectively process the received or stored data, and control the network camera via a data bus and an I/O bus.

The network routing unit 620 is implemented so as to serve as a communication node such as an access point, a router, a switch, or a gateway, complies with a network standard and a protocol defined by Institute of Electrical and Electronics Engineer (IEEE) for network compatibility, and uses a Spanning Tree Protocol (STP).

The STP is an Open System Interconnection (OSI) 2-layer protocol which prevents generation of loops in a duplex network. The STP is a standard defined in IEEE 802.1D/1w/1s and is commonly used as an industrial standard.

FIG. 6 illustrates an example in which the network routing unit 620 is a routing switch. The network routing unit 620 may include an internal port Port0 performing an internal communication with the network controlling unit 610, and two external ports Port1 and Port2 communicating with the network communication units 631 and 632.

Referring to FIG. 6, the network communication unit may include a first physical layer 631 and a second physical layer 632. It should be noted that the first physical layer 631 and the second physical layer 632 may be replaced by a first optic physical layer and a second optic physical layer. An Ethernet Label may be used as a physical layer, and an optical cable may be used as an optic physical layer.

When an optical link (Optic PHY) is used as the optic physical layer, a network image surveillance system may be established in which a distance between network cameras that enables data transmission is extended to about 100 Km.

According to another exemplary embodiment, the network routing unit 620 may perform a network distribution by supporting a virtual local area network (VLAN) function.

According to an exemplary embodiment, the network cameras may perform a routing function and be able to communicate with each other and to route data without separate routers or switches as in FIG. 1.

Referring back to FIG. 2, when an error occurs in the fourth network camera 124 while data is being transmitted from the first network camera 121 to the second network camera 122, data is being transmitted from the second network camera 122 to the third network camera 123, and data is being transmitted from the third network camera 123 to the fourth network camera 124, the network image surveillance system changes this routing direction to a routing direction in which data is transmitted from the third network camera 123 to the second network camera 122 and from the second network camera 122 to the first network camera 121.

FIG. 7 illustrates an example in which a network image surveillance system transmits data in a sequential transmission mode, according to an exemplary embodiment. When a setting of the routing between network cameras is completed in the above-described manner, since each of the two external ports of each network camera is connected to each other in a daisy chain form, each network camera receives a BPDU frame and sequentially transmits a data packet from a network camera that is the farthest from a network camera performing a root router function, to an adjacent camera during a predetermined period of time. In other words, the data packet finally reaches the network camera performing the root router function.

Figure 8:
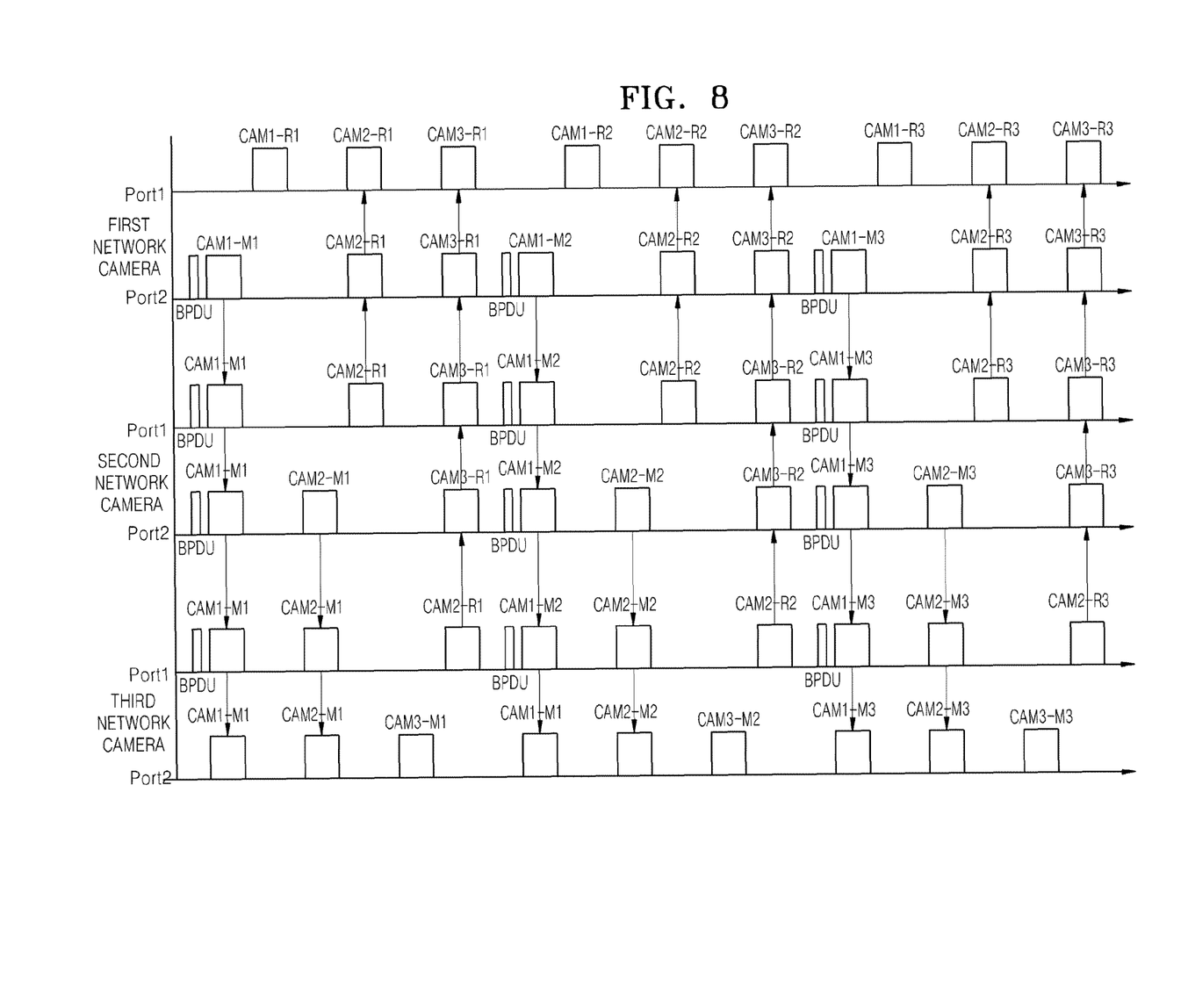
FIG. 8 illustrates an example in which a network image surveillance system distributes and transmits data via Virtual Local Area Network (VLAN) setting according to an exemplary embodiment.

FIG. 8 illustrates an example in which a network image surveillance system distributes and transmits data via Visual Local Area Network (VLAN) setting, according to an exemplary embodiment.

When the network is disconnected during typical data transmission in FIG. 7 or 8, by using a BPUD frame transmitted from the network camera performing the root router function, a network camera functioning as a new root router is selected by an STP, and a root path cost calculation is performed to calculate a new routing path.

As described above, according to the one or more of the above exemplary embodiments, as an image surveillance system is configured to include network camera performing a routing function, wiring of the image surveillance system is simplified, and the number of necessary network equipment such as a switch, a router, and a repeater is decreased. As a result, the cost of implementing the system is reduced.

According to the one or more of the above exemplary embodiments, as buffering and routing are performed in units of frames of an image generated by each network camera, the interruption of image display may be reduced, and the efficiency of video transmission may be improved.

The exemplary embodiments can be implemented through computer readable code on a computer readable recording medium to control at least one processing element to implement any above-described embodiment. The computer readable recording medium may be any type of recording device that stores data which can be read by a computer system.

The computer readable recording medium may include read-only memory (ROM), random-access memory (RAM), CD-ROMs, magnetic tapes, floppy disks, optical data storage devices, etc. The computer readable recording medium can also be distributed over a network coupled to computer systems so that the computer readable code is stored and executed in a distributive manner. Furthermore, the processing element may include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. A network camera comprising:
   an image and audio encoding unit configured to convert an optical image incident from a lens, compress an audio signal from a microphone in a predetermined format, and generate compressed streaming data by encoding the converted image and the compressed audio signal;
   a network controlling unit configured to monitor an input and output status of the compressed streaming data, control a configuration of a packet of the compressed streaming data in accordance with a network quality of system (QoS), control synchronizing the compressed streaming data with a video frame and transmit the synchronized streaming data; and a network routing unit configured to route input and output of the compressed streaming data via at least one network port and implement redundancy by using a Spanning Tree Protocol (STP), wherein the network routing unit comprises:

an internal port configured to communicate internally with the network controlling unit; and two external ports configured to communicate with network communication units including two physical layers, and transmit the compressed streaming data received from the network controlling unit via the internal port to the network communication units via a first external port from among the two external ports, the compressed streaming data being transmitted to an external port of a second network camera via the first external port of the network camera, and the compressed streaming data being sequentially transmitted from a network camera that is farthest from a network camera performing a root router function to an adjacent camera during a predetermined time, and wherein the two external ports are further configured to transmit, if an error occurs in the first external port, the compressed streaming data via a second external port from among the two external ports in a routing direction opposite to a direction in which the compressed streaming data is transmitted via the first external port.

2. The network camera of claim 1, wherein a plurality of network cameras select the network camera performing the root router function from among the plurality of network cameras by exchanging a Configuration Bridge Protocol Data Unit (BPDU) frame in synchronization with a video frame, and network cameras connected to the network camera performing the root router function set a routing port and a routing direction based on a root path cost.

3. The network camera of claim 2, wherein the two external ports are used as the routing port.

4. The network camera of claim 2, wherein the plurality of network cameras form a ring topology structure.

5. The network camera of claim 1, wherein the physical layer is implemented by using an optical cable.

6. The network camera of claim 1, wherein the physical layer is implemented by using an Ethernet cable.

7. The network camera of claim 1, wherein the network controlling unit further comprises a memory configured to store the compressed streaming data transmitted by the image and audio encoding unit.

8. The network camera of claim 1, wherein the network controlling unit is further configured to control a priority of the compressed streaming data according to whether the compressed streaming data is an I frame, a B frame, or a P frame.

9. The network camera of claim 1, wherein the network routing unit is further configured to perform a network distribution by supporting a virtual local area network (VLAN) function.

10. A network image surveillance system comprising:
a server;
a monitoring terminal;
a switch; and
at least one network camera,
wherein the at least one network camera comprises:

an image and audio encoding unit configured to generate compressed streaming data by converting an optical image incident from a lens, compressing an audio signal received from a microphone in a predetermined format, and encoding the converted optical image and the compressed audio signal;

a network controlling unit configured to monitor and receive an input and output status of the compressed streaming data, control a configuration of a packet of the received compressed streaming data in accordance with a network quality of system (QoS), and transmit the compressed streaming data in synchronization with a video frame of the image; and a network routing unit configured to route an input and output of the data via at least one network port and implement redundancy by using a Spanning Tree Protocol (STP), wherein the server, the monitoring terminal, the switch, and the at least one network camera form a ring topology structure, wherein the network routing unit comprises an internal port configured to communicate internally with the network controlling unit, and two external ports configured to communicate with the network communication units including two physical layers and transmit data received from the network controlling unit via the internal port to the network communication units via a first external port from among the two external ports, the data being transmitted to an external port of a second network camera via the first external port of the at least one network camera, and the data being sequentially transmitted from a network camera that is farthest from a network camera performing a root router function to an adjacent camera during a predetermined time, and wherein the two external ports are further configured to transmit, if an error occurs in the first external port, data via a second external port from among the two external ports in a routing direction opposite to a direction in which the data is transmitted via the first external port.

11. The network image surveillance system of claim 10, wherein a plurality of network cameras select the network camera performing the root router function from among the plurality of network cameras by exchanging a Configuration Bridge Protocol Data Unit (BPDU) frame in synchronization with a video frame of the image, and the network cameras connected to the network camera performing the root router function set a routing port and a routing direction based on a root path cost.

12. The network image surveillance system of claim 11, wherein, if a network is disconnected during transmitting data to the set routing port in the set routing direction, a new network camera performing a root router function is selected by using the STP, and a new routing port and a new routing direction are set based on a BPDU frame transmitted by the network camera performing the root router function.

13. The network image surveillance system of claim 11, wherein the plurality of network cameras form a ring topology structure.

14. The network image surveillance system of claim 10, wherein the physical layer is implemented by using an optical cable.

15. The network image surveillance system of claim 11, wherein the two external ports are used as the routing port.

16. The network camera of claim 1, wherein a network camera performing a root router function is identified via a process of exchanging a root path cost by using a Bridge identifier (ID) in a Configuration Bridge Protocol Data Unit (BPDU) frame and a cost table.

17. The network image surveillance system of claim 10, wherein a network camera performing a root router function is identified via a process of exchanging a root path cost by using a Bridge identifier (ID) in a Configuration Bridge Protocol Data Unit (BPDU) frame and a cost table.

* * * * *